(12) United States Patent
Hsieh

(10) Patent No.: US 7,290,964 B2
(45) Date of Patent: Nov. 6, 2007

(54) DRILLING/TAPPING/UNSCREWING APPARATUS

(75) Inventor: Pan-Chung Hsieh, Tou-Liu (TW)

(73) Assignee: Lee Yeong Industrial Co., Ltd., Yunlin Hsien (TW)

( * ) Notice: Subject to any disclaimer, the term of this patent is extended or adjusted under 35 U.S.C. 154(b) by 588 days.

(21) Appl. No.: 10/940,641

(22) Filed: Sep. 15, 2004

(65) Prior Publication Data

US 2005/0230131 A1    Oct. 20, 2005

(30) Foreign Application Priority Data

Apr. 15, 2004    (TW) .............................. 93205839 U

(51) Int. Cl.
*B23B 47/14* (2006.01)

(52) U.S. Cl. ...................... 408/133; 408/134; 408/139; 408/141; 173/170; 173/216; 74/321; 74/323; 470/96; 470/182

(58) Field of Classification Search ................ 408/124, 408/139, 132–134, 141–142; 470/181–182, 470/96; 74/319, 321, 323, 332, 337.5; 173/170, 173/216; *B23B 47/14; B23G 1/18*
See application file for complete search history.

(56) References Cited

U.S. PATENT DOCUMENTS

| | | | | |
|---|---|---|---|---|
| 1,017,785 A | * | 2/1912 | Miller ........................ 408/133 |
| 1,260,896 A | * | 3/1918 | Halstead ...................... 74/318 |
| 1,581,927 A | * | 4/1926 | Kollock ....................... 74/342 |
| 1,752,422 A | * | 4/1930 | Galloway .................... 408/134 |
| 1,977,061 A | * | 10/1934 | Hey ............................ 173/145 |
| 2,370,885 A | * | 3/1945 | Sohm .......................... 74/329 |
| 2,793,305 A | * | 5/1957 | Gerentes ..................... 310/50 |
| 4,710,071 A | * | 12/1987 | Koehler et al. ............. 408/133 |

FOREIGN PATENT DOCUMENTS

DE    2412935 A1  *  10/1975

\* cited by examiner

*Primary Examiner*—Daniel W. Howell
(74) *Attorney, Agent, or Firm*—Troxell Law Office, PLLC

(57) ABSTRACT

A drilling/tapping/unscrewing apparatus including a transmission shaft of a power source on which a drilling ratio gear, a tapping ratio gear and an unscrewing ratio gear are mounted for transmitting the power of the power source to a bit. The apparatus further includes an adjustment unit for controlling the switching between the drilling, tapping and unscrewing operations of the apparatus. The adjustment mechanism includes a bit shaft on which a drilling gear, a tapping gear and an unscrewing gear are fitted. The tapping gear and the unscrewing gear are respectively engaged with the tapping ratio gear and the unscrewing ratio gear. The drilling gear and the tapping gear are controlled by an adjustment button to synchronously move up and down on the bit shaft, whereby the drilling gear can be engaged with or disengaged from the drilling ratio gear.

16 Claims, 10 Drawing Sheets

DRILLING/TAPPING/UNSCREWING APPARATUS

BACKGROUND OF THE INVENTION

The present invention is related to a drilling/tapping/unscrewing apparatus in which the drilling, tapping and unscrewing mechanisms are combined into an integral body without switching the power source between forward rotation and forward rotation.

A conventional drilling, tapping or milling apparatus is mounted on a bed. The bit of the apparatus is drivable by a motor to rotate and reciprocally move for drilling or tapping a work piece. Conventionally, the drilling apparatus and tapping apparatus are separately used. In practice, this often leads to inconvenience. In order to solve this problem, an apparatus in which the drilling and tapping mechanisms are combined into an integral body to facilitate operation and save time. For example, Taiwanese Patent Publication No. 193923 discloses a handheld drilling/tapping apparatus having an integral structure. An upper half of the apparatus is a gear case with an opening facing upward. A diaphragm is disposed on one side of the apparatus to define a distributor case. A motor shaft hole, a first transmission shaft hole, a second transmission shaft, a third transmission shaft hole and a through hole are sequentially formed on bottom face of the gear case. A straight barrel is disposed under the transmission shaft holes. A bit barrel is disposed under the through hole. A space in which a motor is disposed is formed under the motor shaft hole. In the above structure, it is necessary to arrange a transmission, an inducing motor and a rotary mechanism between the motor and the transmission shaft for transmitting the power. In addition, it is necessary to arrange a transmission switching unit between the bit and the main body. It is known by those skilled in this field that the cooperation between the transmission and the motor as well as the peripheral mechanisms is complicated. For example, at least a wheel shaft having a shaft hole is disposed on each side of the driven gear of the transmission for cooperating with the tooth structure of rear section of the main shaft. Accordingly, the power can be variably transmitted from the driving gear to the driven gear. Some manufacturers use forward/backward rotatable carbon brush motor or servomotor and speed adjustor to replace the inducing motor and control the transmission. This can somewhat simplify a part of the structure. However, the cost for the motor is very high so that the apparatus is quite expensive. This will affect the competition of the product on the market. In addition, the speed adjustor is very easy to damage.

Therefore, it is necessary to provide a drilling/tapping/unscrewing apparatus in which the drilling, tapping and unscrewing mechanisms are combined into an integral body. The apparatus has simple structure cooperating with a common motor for driving the bit without switching the power source between forward rotation and forward rotation.

SUMMARY OF THE INVENTION

It is therefore a primary object of the present invention to provide a drilling/tapping/unscrewing apparatus in which the drilling, tapping and unscrewing mechanisms are combined into an integral body without switching the power source between forward rotation and forward rotation.

According to the above object, the drilling/tapping/unscrewing apparatus of the present invention includes a transmission shaft of a power source on which a drilling ratio gear, a tapping ratio gear and an unscrewing ratio gear are mounted for transmitting the power of the power source to a bit. The apparatus further includes an adjustment unit for controlling the switching between the drilling, tapping and unscrewing operations of the apparatus. The adjustment mechanism includes a bit shaft on which a drilling gear, a tapping gear and an unscrewing gear are fitted. The tapping gear and the unscrewing gear are respectively engaged with the tapping ratio gear and the unscrewing ratio gear. The drilling gear and the tapping gear are controlled by an adjustment button to synchronously move up and down on the bit shaft, whereby the drilling gear can be engaged with or disengaged from the drilling ratio gear.

The present invention can be best understood through the following description and accompanying drawings wherein:

DETAILED DESCRIPTION OF THE PREFERRED EMBODIMENTS

Figure 1:
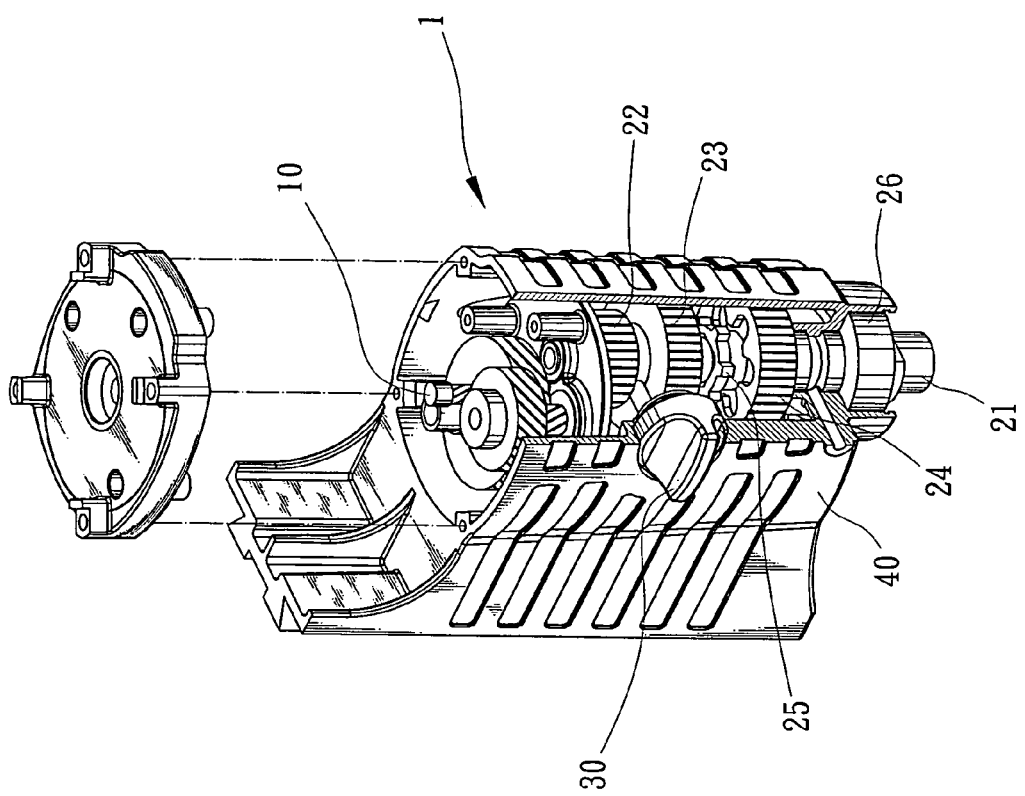
FIG. 1 is a perspective assembled view of the present invention.
Figure 2:
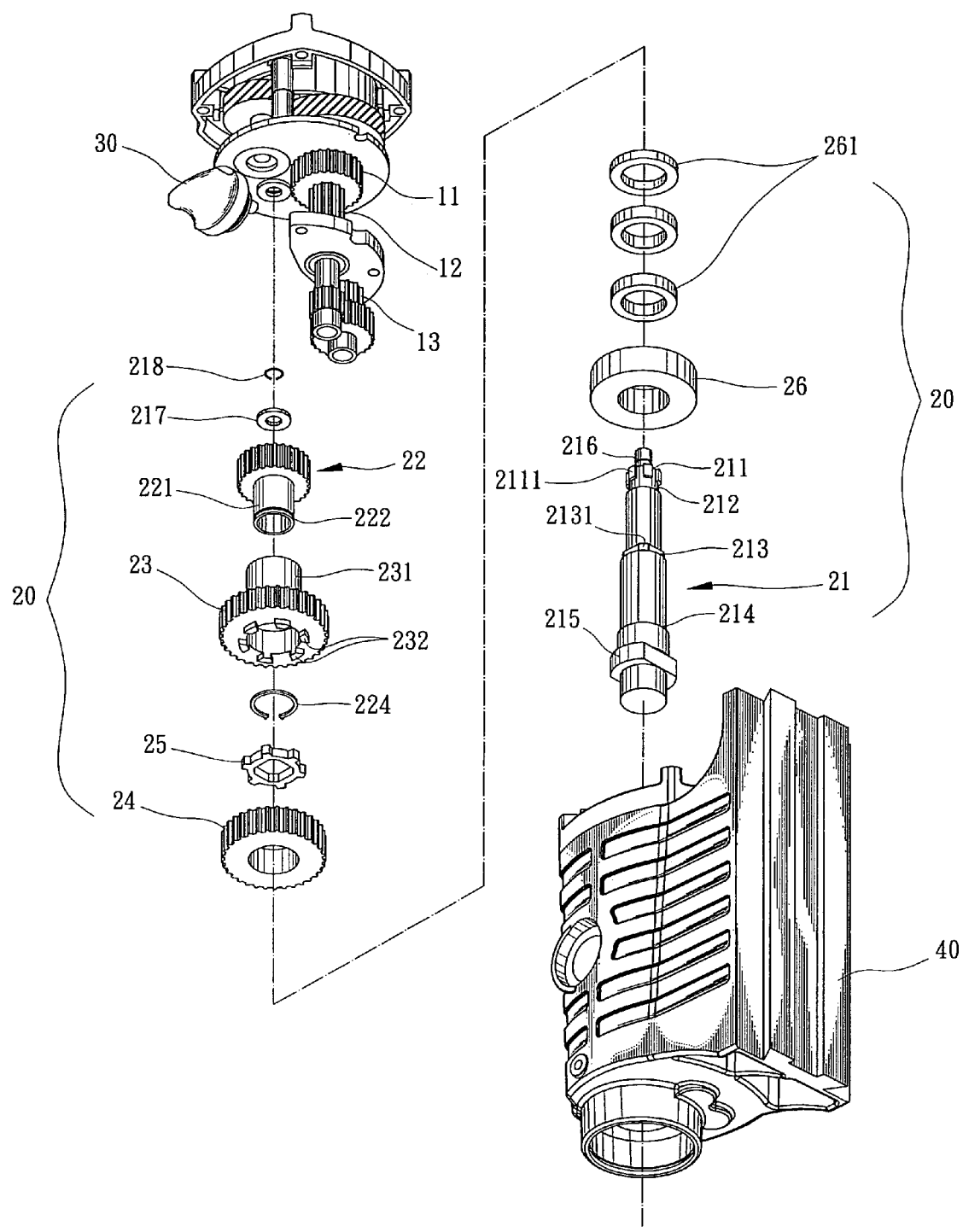
FIG. 2 is a perspective exploded view of the present invention.

Please refer to FIGS. 1 and 2. The drilling/tapping/unscrewing apparatus of the present invention includes a transmission shaft 10 of a power source, a drilling ratio gear 11 (backward gear) mounted on the transmission shaft 10, a tapping ratio gear 12 (backward gear) mounted on the transmission shaft 10 and an unscrewing ratio gear 13 (forward gear) mounted on the transmission shaft 10. The power of the power source via the transmission shaft and the gears is transmitted to a bit. An adjustment unit 20 serves to control switching the apparatus between the drilling, tapping and unscrewing operations. The adjustment mechanism 20 includes a bit shaft 21 on which a drilling gear 22, a tapping gear 23 and an unscrewing gear 24 are fitted. The tapping gear 23 and the unscrewing gear 24 are respectively engaged with the tapping ratio gear 12 and unscrewing ratio gear 13. The drilling gear 22 and the tapping gear 23 are controlled by an adjustment button 30 to synchronously move up and down on the bit shaft 21, whereby the drilling gear 22 can be engaged with or disengaged from the drilling ratio gear 11.

The bit shaft 21 is formed with a first enlarged shoulder face 211, a second enlarged shoulder face 212, a third enlarged shoulder face 213, a fourth enlarged shoulder face 214 and an enlarged stop section 215 from upper end to lower end. The outer circumference of the first shoulder face 211 is formed with six outer splines 2111. In addition, a retainer ring groove 216 is formed on the shaft above the first shoulder face 211, in which a C-shaped retainer ring 218 is latched. A locating ring 217 is fixedly fitted under the retainer ring groove 216. A polygonal boss 2131 is formed on the third shoulder face 213.

An extension sleeve 221 extends from lower end of the drilling gear 22. A retainer ring groove 222 is formed on lower end of the sleeve 221. Six inner splines 223 are formed in upper end of the shaft hole of the sleeve 221. The inner splines 223 can be fitted with or separated from the outer splines 2111 of the bit shaft 21.

The tapping gear 23 has an upward extending sleeve 231. Multiple keys 232 are annularly arranged on lower end face of the tapping gear 23. The tapping gear 23 is rotatably fitted on the extension sleeve 221 of the drilling gear 22. A C-shaped retainer ring 224 is latched in the retainer ring groove 222 for abutting against the tapping gear 23 and locating the tapping gear 23 on the drilling gear 22.

The adjustment button 30 is disposed on outer side of a housing 40, including a suspension arm 31 which can be 180 degrees swung up or down. When swung upward, the suspension arm 31 pushes the drilling gear 22 to move upward. At the same time, the upper end face of the drilling gear 22 further pushes the locating ring 217 at upper end of the bit shaft 21, whereby the bit shaft 21 can be rotated without moving up or down. When swung downward, the suspension arm 31 pushes the tapping gear 23 to move downward, permitting the bit shaft 21 to move downward.

A snap ring 25 is fixed on the polygonal boss 2131 of the third shoulder face 213 of the bit shaft 21, whereby the snap ring 25 and the bit shaft 21 are synchronously rotatable. A splined recess 241 is formed on upper end face of the unscrewing gear 24. The unscrewing gear 24 is fitted on the bit shaft 21 under the third shoulder face 213. A collar 26 is fitted on the bit shaft 21 under the fourth shoulder face 214. The lower end face of the collar 26 abuts against the upper end of the enlarged stop section 215. The outer circumference of the collar 26 is inserted in the housing 40. In addition, at least one oil-sealing washer 261 is disposed between the lower end face of the unscrewing gear 24 and the upper end face of the collar 26.

Figure 3:
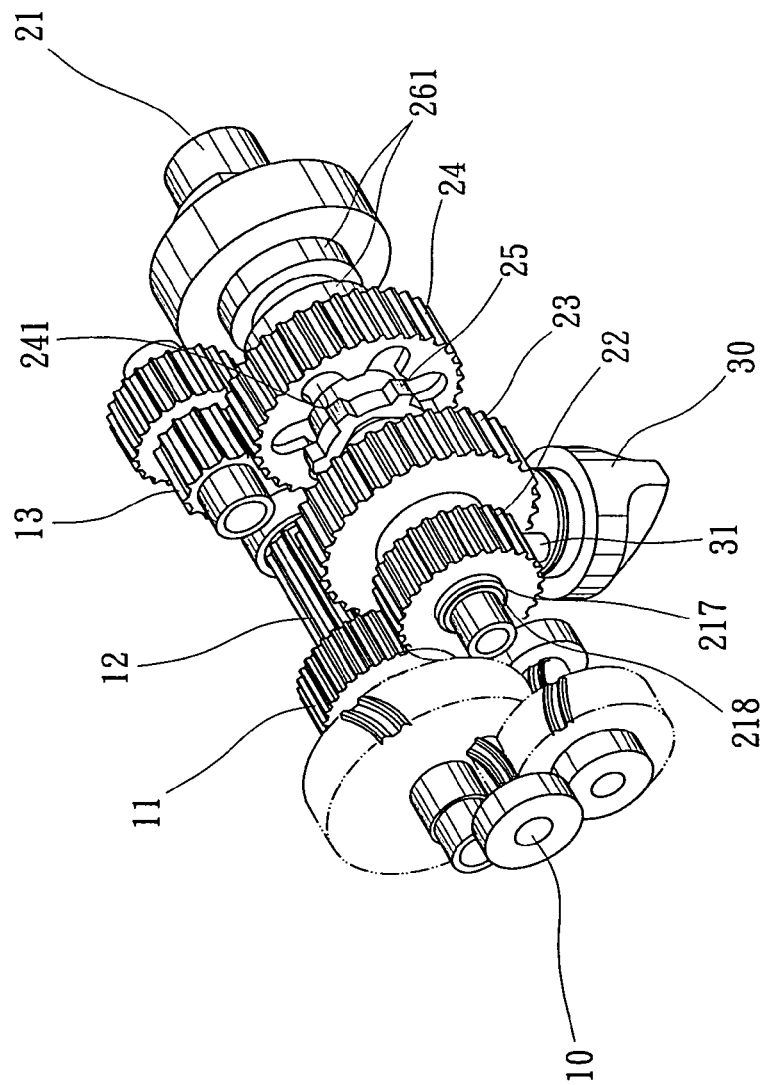
FIG. 3 is a perspective view of the present invention, showing the drilling operation thereof.
Figure 4:
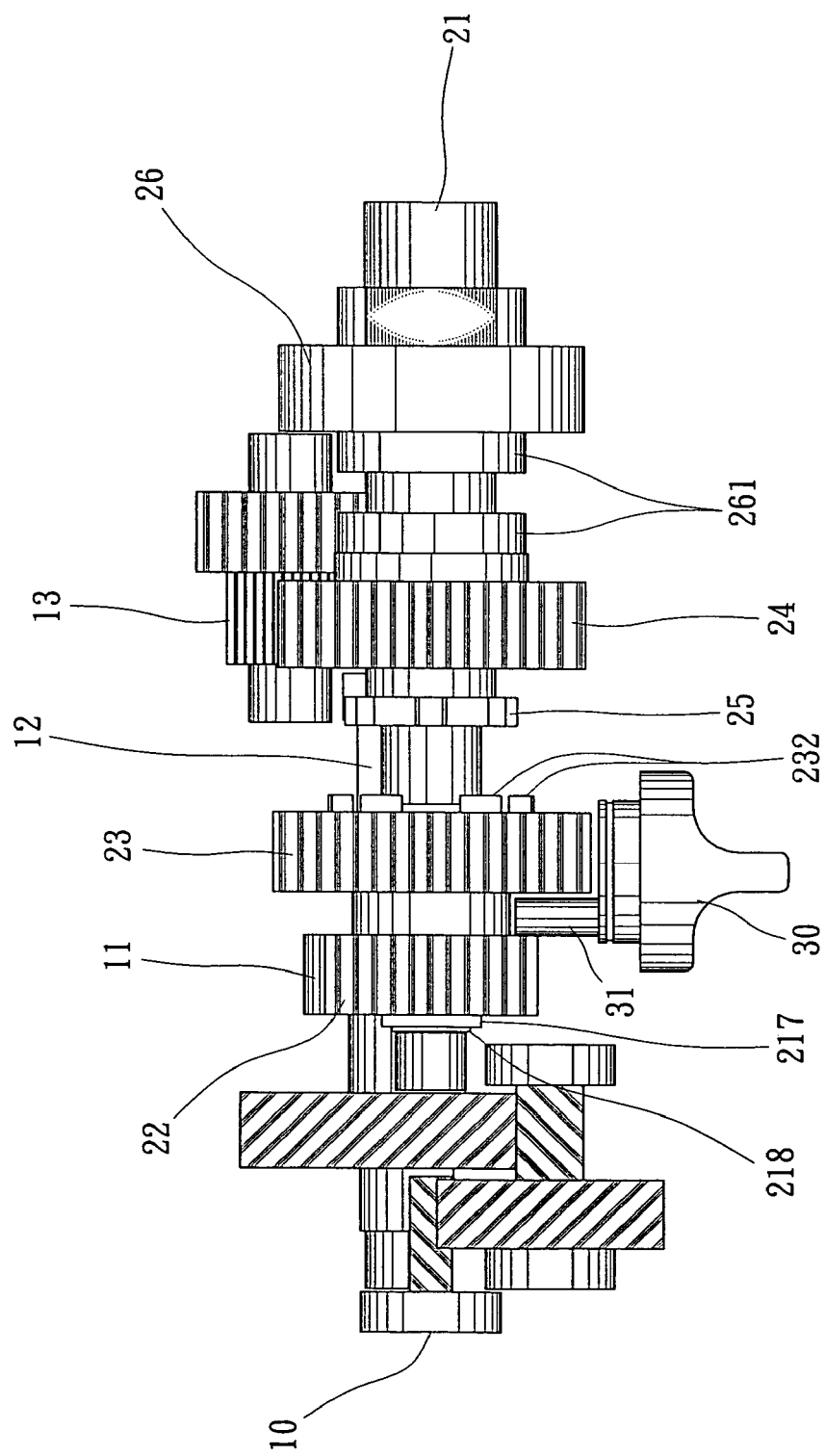
FIG. 4 is a plane view according to FIG. 3.
Figure 5:
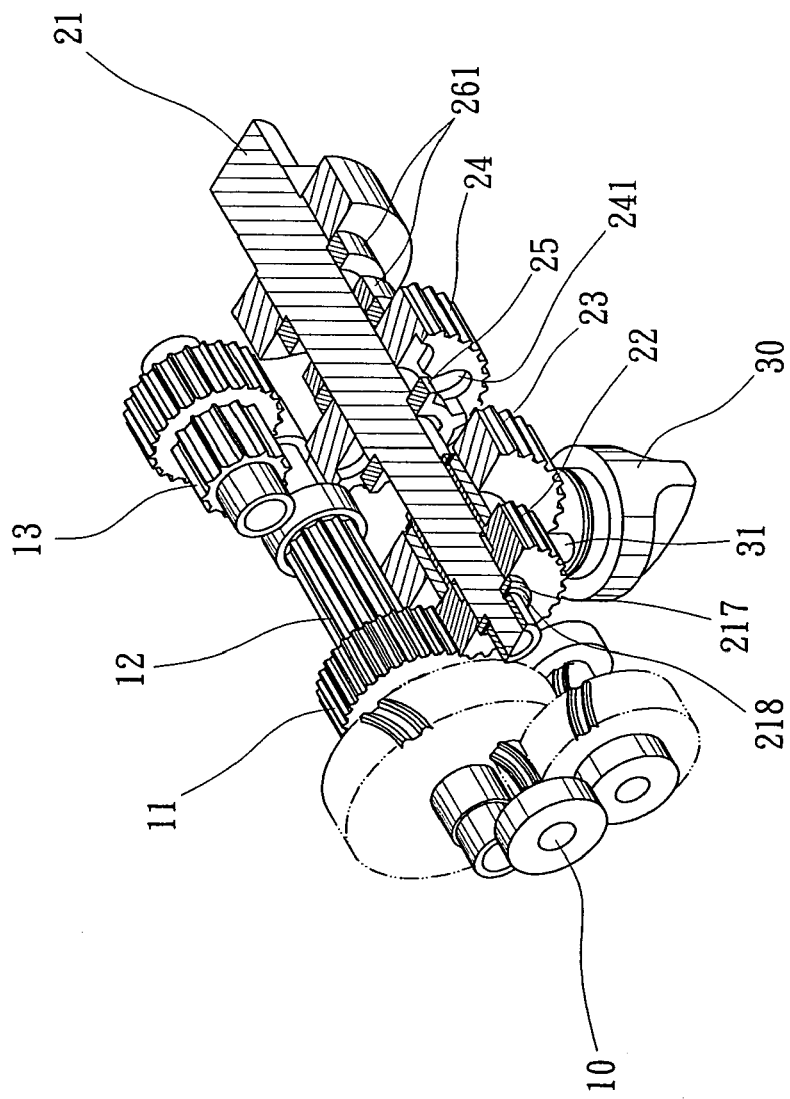
FIG. 5 is a perspective sectional view according to FIG. 3.

Referring to FIGS. 3 to 5, in drilling operation of the present invention, when the adjustment button 30 is manually 180 degrees swung upward, the suspension arm 31 of the adjustment button 30 pushes the drilling gear 22 to move upward. At the same time, the tapping gear 23 is synchronously moved upward. The six inner splines 223 of the drilling gear 22 are fitted with the six outer splines 216 of the bit shaft 21. The drilling gear 22 is engaged with the drilling ratio gear 11 (backward gear), whereby the power is transmitted from the drilling ratio gear 11 to the drilling gear 22 and then to the bit shaft 21 for driving a bit to rotate and drill a work piece.

Figure 6:
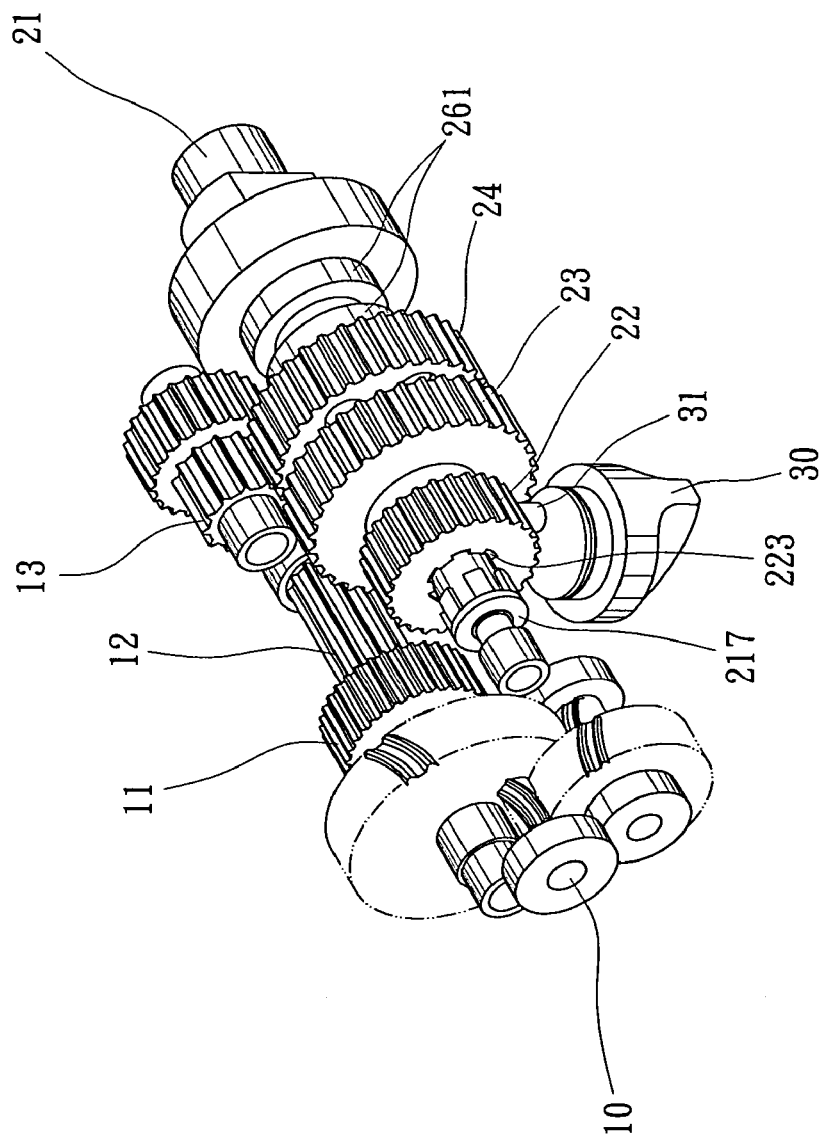
FIG. 6 is a perspective view of the present invention, showing the tapping operation thereof.
Figure 7:
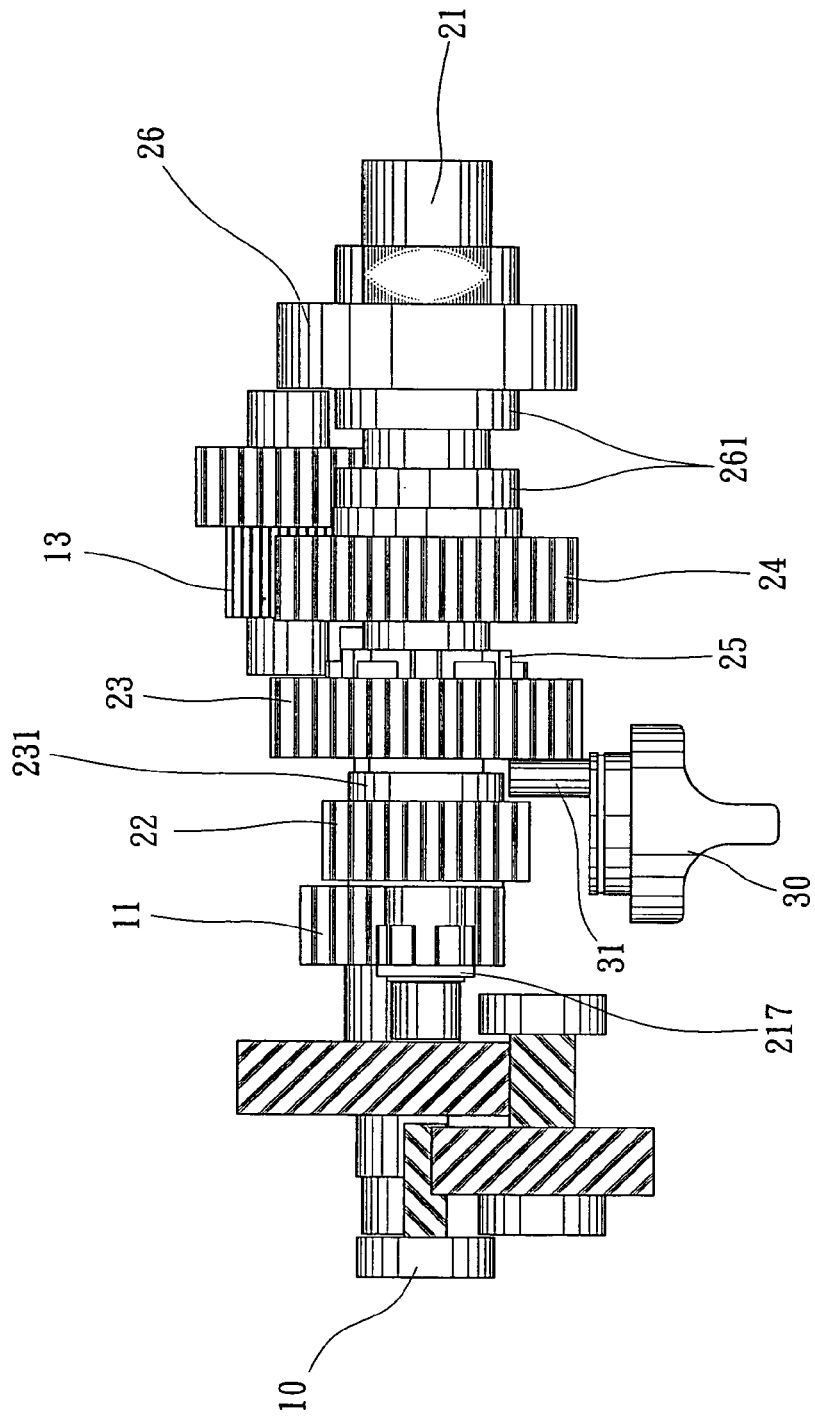
FIG. 7 is a plane view according to FIG. 6.
Figure 8:
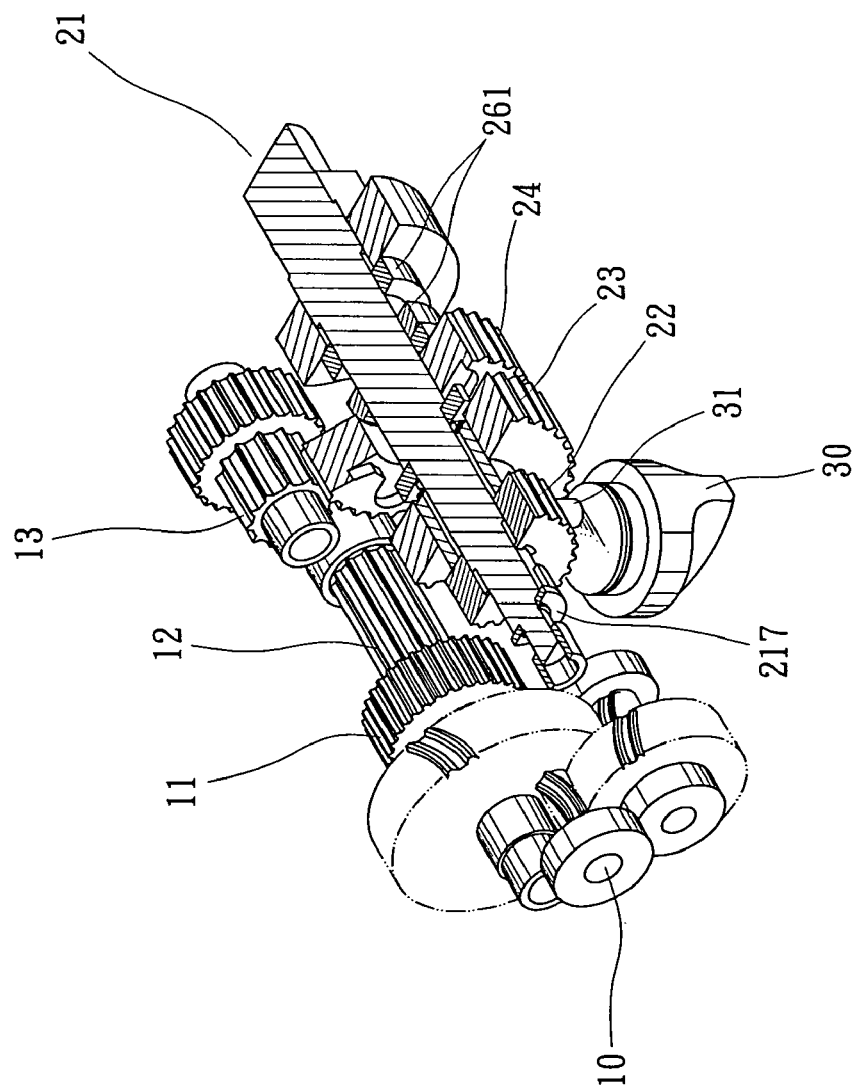
FIG. 8 is a perspective sectional view according to FIG. 6.

Referring to FIGS. 6 to 8, in tapping operation of the present invention, when the adjustment button 30 is manually 180 degrees swung downward, the suspension arm 31 of the adjustment button 30 pushes the tapping gear 23 to move downward. At the same time, the drilling gear 22 is synchronously moved downward. The drilling gear 22 is disengaged from the drilling ratio gear 11 and the six inner splines 223 of the drilling gear 22 are separated from the six outer splines 216 of the bit shaft 21. The snap ring 25 of the bit shaft 21 is engaged with the annularly arranged keys 232 of lower end face of the tapping gear 23, whereby the power is transmitted from the tapping ratio gear 12 to the tapping gear 23 and then to the snap ring 25 and the bit shaft 21 for driving the bit to rotate and tap the work piece.

Figure 9:
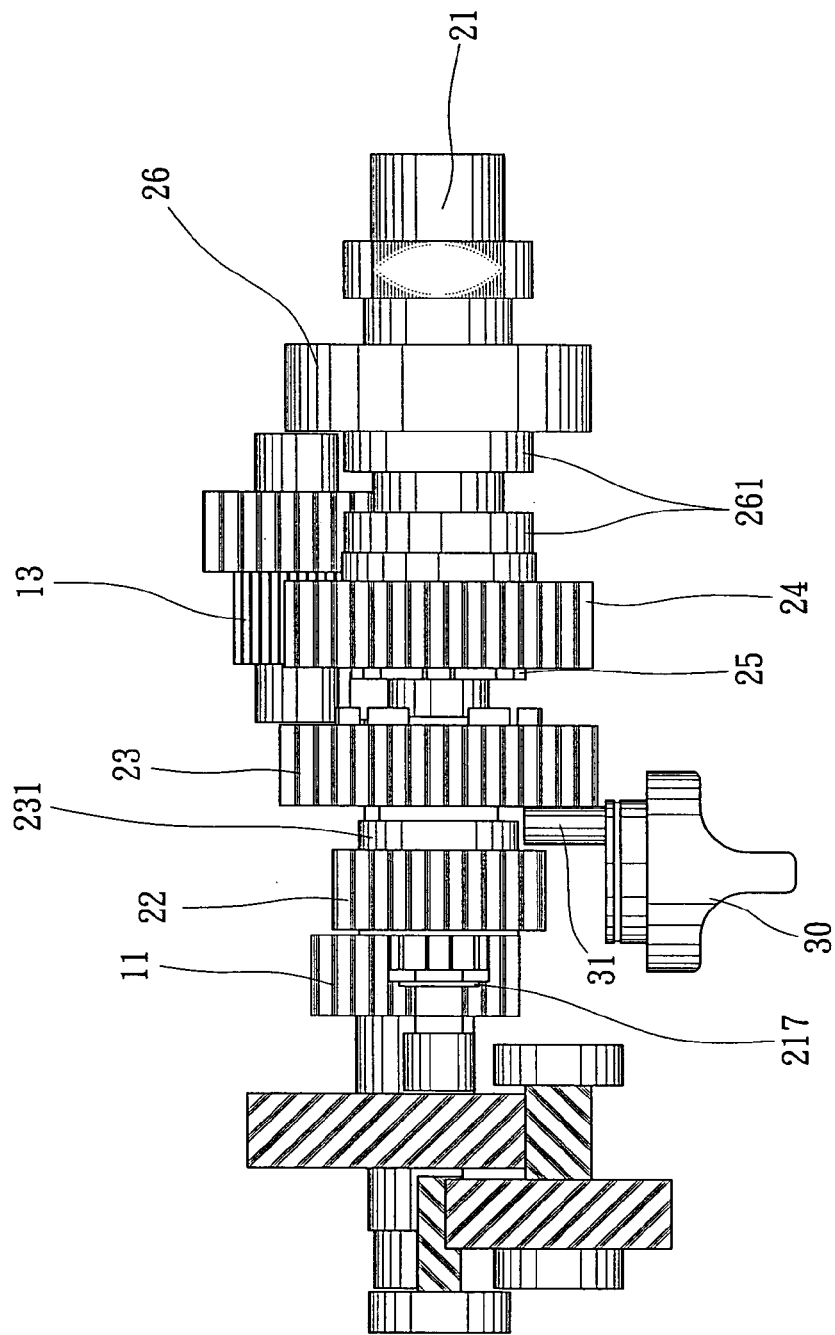
FIG. 9 is a plane view showing the position of the bit shaft of the present invention in unscrewing operation.
Figure 10:
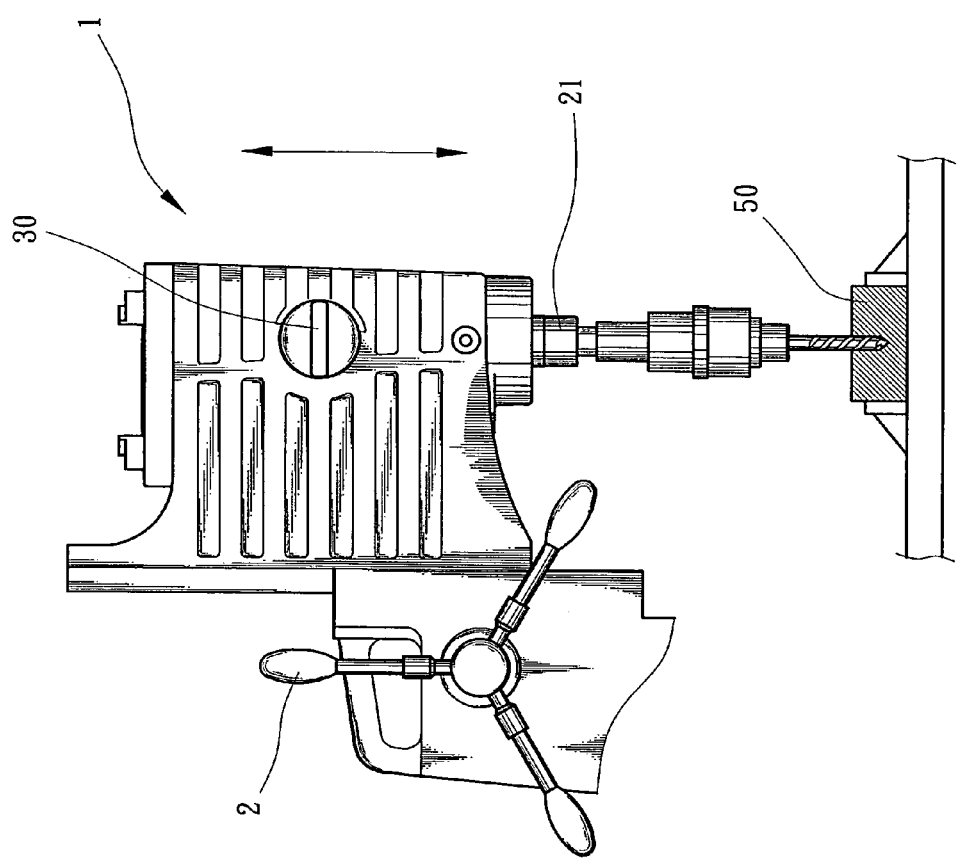
FIG. 10 is a plane view of the present invention, showing the ascending/descending operation thereof.

Referring to FIGS. 9 and 10, after the tapping operation is finished, an operator starts to unscrew the bit. At this time, the operator operates a control handle 2 of the apparatus 1 to upward move the apparatus 1 along an elevation shaft. When the apparatus 1 is moved upward, the work piece 50 fixed on the bed will pull the bit of the bit shaft 21 downward. Accordingly, the bit shaft 21 is moved downward and the snap ring 25 of the bit shaft 21 is separated from the keys 232 of the tapping gear 23. The bit shaft 21 is further moved downward to make the snap ring 25 engaged with the splined recess 241 of upper end face of the unscrewing gear 23 (backward gear). The power is transmitted from the unscrewing ratio gear 13 to the unscrewing gear 24 and then to the snap ring 25 and the bit shaft 21 for rotating and unscrewing the bit out of the work piece.

Referring to FIG. 10, after the drilling, tapping and unscrewing operation is completed, the control handle 2 is operated to upward move the apparatus 1 along the elevation shaft so as to separate the bit from the work piece 50. Then, the adjustment button 30 is manually 180 degrees swung upward. At this time, the suspension arm 31 of the adjustment button 30 pushes the drilling gear 22 to move upward. At the same time, the upper end face of the drilling gear 22 further pushes the locating ring 217 of upper end of the bit shaft 21 to move the bit shaft 21 upward and restore the bit shaft 21 to its home position. Under such circumstance, the bit shaft 21 can only rotate without possibility of moving up or down. Thereafter, the above procedure is repeated for drilling, tapping and unscrewing operation for next work piece 50.

The above structure of the present invention is simplified. By means of a common motor, the drilling, tapping and unscrewing mechanisms can be combined into an integral body without switching the power source between forward rotation and forward rotation. Therefore, the manufacturing cost for the apparatus is lowered and the failure ratio is reduced.

The above embodiments are only used to illustrate the present invention, not intended to limit the scope thereof. Many modifications of the above embodiments can be made without departing from the spirit of the present invention.

What is claimed is:

1. A drilling/tapping/unscrewing apparatus comprising a transmission shaft of a power source, a drilling ratio gear mounted on the transmission shaft, a tapping ratio gear mounted on the transmission shaft and an unscrewing ratio gear mounted on the transmission shaft in a housing, the power of the power source via the transmission shaft and the gears being transmitted to a bit, the apparatus further comprising an adjustment unit for controlling the drilling, tapping and unscrewing operations of the apparatus, said apparatus being characterized in that the adjustment mechanism includes a bit shaft on which a drilling gear, a tapping gear and an unscrewing gear are fitted, the tapping gear and the unscrewing gear being respectively engaged with the tapping ratio gear and the unscrewing ratio gear, the drilling gear and the tapping gear being controlled by an adjustment button to synchronously move up and down on the bit shaft, whereby the drilling gear can be engaged with or disengaged from the drilling ratio gear.

2. The drilling/tapping/unscrewing apparatus as claimed in claim 1, wherein the bit shaft is formed with a first enlarged shoulder face, a second enlarged shoulder face, a third enlarged shoulder face, a fourth enlarged shoulder face and an enlarged stop section from upper end to lower end, the first enlarged shoulder face being formed with six outer splines, a polygonal boss being formed on the third enlarged shoulder face.

3. The drilling/tapping/unscrewing apparatus as claimed in claim 2, wherein an extension sleeve extends from lower end of the drilling gear, a retainer ring groove being formed on lower end of the sleeve, six inner splines being formed in upper end of a shaft hole of the sleeve, whereby the inner splines can be fitted with or separated from the outer splines of the first enlarged shoulder face of the bit shaft.

4. The drilling/tapping/unscrewing apparatus as claimed in claim 3, wherein the tapping gear has an upward extending sleeve, multiple keys being annularly arranged on lower end face of the tapping gear, the tapping gear being rotatably fitted on the extension sleeve of the drilling gear, a C-shaped retainer ring being latched in the retainer ring groove.

5. The drilling/tapping/unscrewing apparatus as claimed in claim 2, wherein a snap ring is fixed on the polygonal boss of the third enlarged shoulder face of the bit shaft, whereby the snap ring and the bit shaft are synchronously rotatable.

6. The drilling/tapping/unscrewing apparatus as claimed in claim 2, wherein a splined recess is formed on upper end face of the unscrewing gear, the unscrewing gear being fitted on the bit shaft under the third enlarged shoulder face.

7. The drilling/tapping/unscrewing apparatus as claimed in claim 2, wherein a collar is fitted on the bit shaft under the fourth enlarged shoulder face, a lower end face of the collar abutting against an upper end of the enlarged stop section of the bit shaft.

8. The drilling/tapping/unscrewing apparatus as claimed in claim 7, wherein at least one oil-sealing washer is disposed between a lower end face of the unscrewing gear and an upper end face of the collar.

9. The drilling/tapping/unscrewing apparatus as in claim 1, wherein the adjustment button is disposed on outer side of the housing, the adjustment button including a suspension arm.

10. The drilling/tapping/unscrewing apparatus as in claim 2, wherein the adjustment button is disposed on outer side of the housing, the adjustment button including a suspension arm.

11. The drilling/tapping/unscrewing apparatus as in claim 3, wherein the adjustment button is disposed on outer side of the housing, the adjustment button including a suspension arm.

12. The drilling/tapping/unscrewing apparatus as in claim 4, wherein the adjustment button is disposed on outer side of the housing, the adjustment button including a suspension arm.

13. The drilling/tapping/unscrewing apparatus as in claim 5, wherein the adjustment button is disposed on outer side of the housing, the adjustment button including a suspension arm.

14. The drilling/tapping/unscrewing apparatus as in claim 6, wherein the adjustment button is disposed on outer side of the housing, the adjustment button including a suspension arm.

15. The drilling/tapping/unscrewing apparatus as in claim 7, wherein the adjustment button is disposed on outer side of the housing, the adjustment button including a suspension arm.

16. The drilling/tapping/unscrewing apparatus as in claim 8, wherein the adjustment button is disposed on outer side of the housing, the adjustment button including a suspension arm.

* * * * *